May 18, 1943.  S. W. DUSDIEKER  2,319,494
AUTOMATIC ELECTRIC LIGHT CONTROL APPARATUS FOR VEHICLES
Filed Sept. 16, 1940

Inventor
Stanley W. Dusdieker
by Orwig & Hague
Atty's

Patented May 18, 1943

2,319,494

UNITED STATES PATENT OFFICE 2,319,494

AUTOMATIC ELECTRIC LIGHT CONTROL APPARATUS FOR VEHICLES

Stanley W. Dusdieker, Des Moines, Iowa

Application September 16, 1940, Serial No. 356,972

3 Claims. (Cl. 200—56)

The object of my invention is to provide an apparatus of simple, durable and inexpensive construction especially designed for automatic lighting control and whereby when the automobile is parked in daylight and the automobile ignition system is turned off, then when it becomes dark the tail lights and the parking lights are automatically lighted. Further, when the automobile ignition system is turned on, in daylight, the headlights and tail lights are not lighted, but after dark both are automatically lighted, and, furthermore, the headlights are automatically controlled to be dimmed by the light from an approaching headlight, thereby providing complete automatic lighting control when the automobile is parked and when being driven either by day or night.

In the accompanying drawing—

Figure 2:
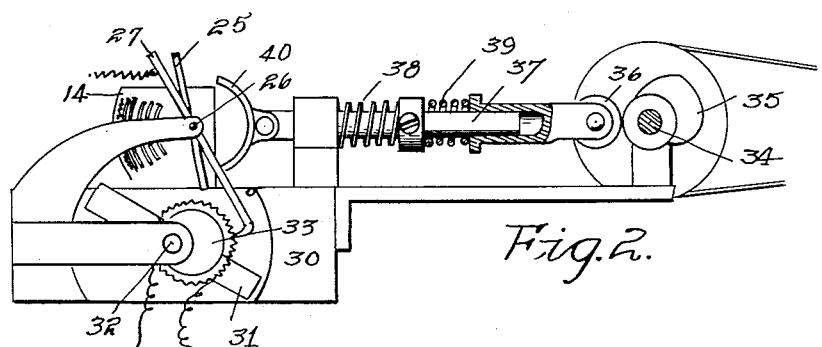
Figure 2 shows a side view, partly in section, of the mechanism for actuating the arm of the controlling switch.
Figure 3:
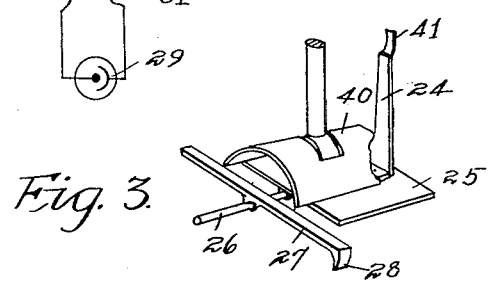
Figure 3 shows a detail perspective view of the switch arm, the control arm and the curved plate for moving the switch arm to the position assumed by the control arm.
Figure 4:
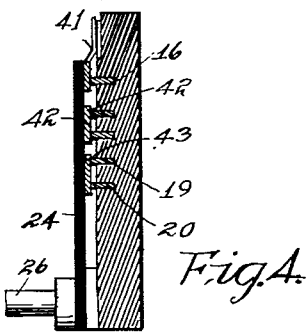
Figure 4 shows a detail sectional view of the controlling switch on the line 4—4 of Figure 1.

The apparatus comprises an electric battery 10, such, for instance, as the ignition battery of an automobile. The headlights 11, the tail lights 12 and the parking lights 13 are all electrically connected to the return electrode of the battery.

The controlling switch comprises a frame 14. At the upper portion of the frame is a segmental resistance coil 15. Below it and spaced apart from each other are the conductor segments 16, 17, 18, 19 and 20. At the left end the conductor segments 16 and 18 extend beyond the other conductor segments. The headlights 11 are electrically connected to the coil 15, the tail light 12 to the segment 17, and the parking light 13 to the segment 19.

A manually operable switch 21 is provided in the battery circuit. When this switch is in one position, as shown by solid lines in Fig. 1, a circuit is established through the conductor 23, and when in its other position, as shown by dotted lines in Fig. 1, a circuit is established through the conductor 22.

The switch arm 24 is fixed to a control plate 25, which is pivotally mounted on a shaft 26, and fixed to this shaft is a control bar 27, having an arm 28 at one end.

For automatically adjusting the position of the bar 27 I have provided the following: A photoelectric cell 29 is mounted at the front of the vehicle and electrically connected with a galvanometer 30. The movable element 31 of the galvanometer is fixed to a shaft 32. Fixed to this shaft is an eccentric disc 33 mounted in position to be engaged by the arm 28 of the control bar 27.

A power rotated shaft 34 is provided with a cam 35, which engages a roller 36 on a sliding shaft 37. A spring 38 holds the roller against the cam. This shaft is formed of two parts slidingly connected, and a spring 39 yieldingly holds the movable part in its extended position. On the end of the shaft is a curved push plate 40, pivotally supported in position to engage both the switch plate 25 and the control bar 27. This power shaft is operated continuously from any suitable source of power. It is well known that the amount of power delivered by a photoelectric cell is limited but is sufficient to move the disc 33. However, it does not have sufficient power to move the switch arm 24 and the constantly moving reciprocating device furnishes the power necessary to move the switch arm 24, its movement being governed by the position of the disc 33. The operation of this part of the device is as follows: When the eccentric 35 is in the position shown in Fig. 2, the push plate 40 will engage the control bar 27 below its center, then the upper edge of the push plate 40 will engage the upper portion of the switch plate 25 and tend to move the switch arm 24 which is attached to it, to the position shown by dotted lines in Fig. 1. This switch arm 24 will be frictionally held in any position in which it is placed. When the eccentric 33 is moved to its position opposite from that shown in Fig. 2, the control bar 27 is moved by the push plate 40 to position with its lower end a considerable distance to the left relative to its position in Fig. 2, and when in this position the push plate 40 will engage the lower end of the switch plate 25 and move its lower end to the left, thereby moving the switch arm 24 to the position shown by solid lines in Fig. 1.

On the switch bar 24 is a contact device 41 to electrically connect the resistance segment 15 and the segment 16. Also a contact segment 42 is provided to electrically connect the segments 17 and 18; also a contact segment 43 is provided to electrically connect the segments 19 and 20.

Figure 1:
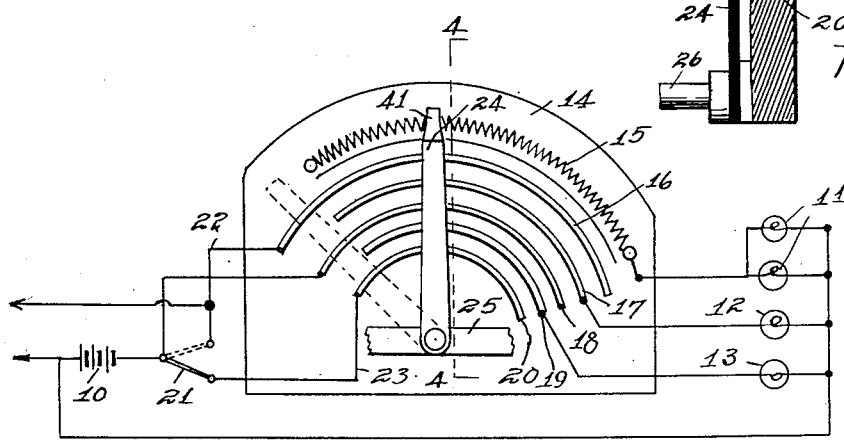
Figure 1 illustrates diagrammatically the controlling switch device and the electric circuits.

When the switch arm 24 is at its left limit of movement, as shown by dotted lines in Fig. 1, it contacts with the segments 16, 18 and 20.

In practical operation, and assuming that my apparatus were applied to an automobile and that the automobile was being operated during daylight, at such time, of course, the switch 21 is turned on to the position shown by solid lines in Figure 1 and all of the automobile lights are off. Upon the approach of darkness, however, the photoelectric cell is operated to move the movable element of the galvanometer to position for causing the control bar 27 to move to such position as to move the control plate 25 and the switch arm 24 toward the right, as shown in Fig. 1. When this has been done, current from the battery 10 flows through the conductor segment 16 and through the contact device 41 to the resistance coil 15 and to the headlights. At the same time the segment 18 is energized by the battery 10 and current flows through the contact 42 to the segment 17, thus energizing the tail light circuit. When, however, the automobile is parked, say during daylight, then all of the lights are off, but upon the approach of darkness the photoelectric cell and the galvanometer operate the switch 24 and move it toward the right. The segments 18 and 20 are energized and circuits are established through both the tail light and the parking light, and this will continue until daylight again operates the photoelectric cell and the galvanometer to return the switch arm 24 to its dotted line position.

My improved apparatus automatically operates to provide for all of the lighting requirements of an automobile. When parked and with the circuit cut off, the parking lights are automatically lighted as darkness approaches, and shut off when there is enough light to obviate the need for parking lights. When the switch 21, and the switch arm 24 is in the dotted line position shown in Fig. 1. When driving at night the operator turns the switch 21 to the dotted line position shown in Fig. 1, thereby lighting the head lights, when the switch arm 24 is in the position shown by solid lines in Fig. 1. When an approaching headlight operates the photoelectric cell and the switch arm is moved to the dotted line position shown in Fig. 1, the head lights are dimmed. The headlights are not automatically lighted in day time driving because the switch 21 is in its solid line position, as shown in Fig. 1, and current is not supplied to the headlight circuit because the switch arm 24 is out of contact with the coil and headlight circuit.

I have herein described my invention as being applied to automobile lighting and have used the terms "switch," "headlights," "tail lights" and "parking lights." The apparatus can be used for other lighting purposes, and I wish to have it understood that my claims be construed to cover the equivalents of said elements when used for other than automobile lighting control.

I have described a headlight circuit and also a parking light circuit. Both of these circuits are shown in the drawings to be from a single battery. Obviously, these two circuits could be energized in various ways.

I claim as my invention:

1. A switch for automatic electric circuit control apparatus, comprising a pivoted eccentric, means for moving said eccentric about its pivot point, a control bar movable toward and from the pivotal center of the eccentric, the amount of such movement being determined by the position of the eccentric, an electric switch push plate pivoted adjacent said arm bar, an electric switch operatively connected with said control bar and whereby the position of the control bar determines the position of the electric switch, a reciprocating push plate movable toward and from said control bar and switch plate, and shaped to engage both said bar and said plate and to move the plate to a position determined by the position of the bar, and whereby the movement of the switch is determined by the position of the eccentric, and means for periodically and repeatedly moving the push plate toward the said bar.

2. A switch for automatic electric circuit control apparatus, comprising a pivoted eccentric, means for moving said eccentric about its pivot point, a control bar pivotally supported and extended in opposite directions from its pivotal center and in position to engage the periphery of said eccentric, an electric switch push plate pivotally supported at the same pivotal center as said control bar, an electric switch operatively connected with the push plate, a push bar supported for longitudinal movement, a push plate pivoted thereto and shaped to engage said control bar and said switch plate on opposite sides of their pivotal points, whereby the switch plate may be moved to position parallel with that of the control bar, and means for reciprocating the push bar.

3. A switch for automatic electric control apparatus, comprising a galvanometer having a movable member, a pivoted control bar, means operated by the said movable member for limiting the movement of the control bar in one direction, the amount of such movement being determined by the position of the said movable member, a switch push plate pivotally supported adjacent said control bar, an electric switch operatively connected with said push plate, a push bar movable toward and from said control bar and said switch push bar, and shaped to engage both of them and to move the switch push bar through a path of movement the length of which is determined by the position of the push bar, and means for mechanically and periodically operating said push bar.

STANLEY W. DUSDIEKER.